United States Patent
Nestel et al.

(10) Patent No.: US 9,340,291 B2
(45) Date of Patent: May 17, 2016

(54) AIRCRAFT SEAL

(71) Applicant: B/E Aerospace, Inc., Wellington, FL (US)

(72) Inventors: Eric D. Nestel, Clemmons, NC (US); Thomas Livengood, Winston-Salem, NC (US); Billy Simpson, Boonville, NC (US)

(73) Assignee: B/E AEROSPACE, INC., Wellington, FL (US)

( * ) Notice: Subject to any disclaimer, the term of this patent is extended or adjusted under 35 U.S.C. 154(b) by 0 days.

(21) Appl. No.: 14/338,747

(22) Filed: Jul. 23, 2014

(65) Prior Publication Data

US 2015/0028638 A1 Jan. 29, 2015

Related U.S. Application Data

(60) Provisional application No. 61/858,779, filed on Jul. 26, 2013.

(51) Int. Cl.
| | | |
|---|---|---|
| *B64D 11/00* | (2006.01) | |
| *B64D 11/06* | (2006.01) | |
| *F16J 15/02* | (2006.01) | |

(52) U.S. Cl.
CPC ............... *B64D 11/06* (2013.01); *F16J 15/022* (2013.01); *F16J 15/027* (2013.01)

(58) Field of Classification Search
CPC . F16J 15/027; F16J 15/022; B64D 11/00155; B64D 11/00; B64D 2045/009; B64C 1/066
USPC .......... 52/717, 716.1; 49/475.1, 489.1, 493.1, 49/498.1; 277/644, 647, 630, 637, 652, 277/654; 244/129.1, 129.2, 129.4, 117 R, 244/119, 120
See application file for complete search history.

(56) References Cited

U.S. PATENT DOCUMENTS

| | | | | |
|---|---|---|---|---|
| 3,061,896 | A | * | 11/1962 | Wahlfeld .................... 49/469 |
| 3,572,735 | A | * | 3/1971 | Dryer ........................ 277/637 |
| 3,922,460 | A | * | 11/1975 | Jackson ...................... 428/217 |
| 4,161,853 | A | * | 7/1979 | Weiss et al. ................. 52/288.1 |
| 4,930,279 | A | * | 6/1990 | Bart ........................ B60R 13/04 296/213 |
| 5,001,297 | A | * | 3/1991 | Peregrim et al. ............. 174/354 |
| 5,096,753 | A | * | 3/1992 | McCue et al. ................. 428/31 |
| 5,149,569 | A | * | 9/1992 | McCue .......................... 428/31 |

(Continued)

FOREIGN PATENT DOCUMENTS

EP 2 463 083 A2 6/2012

OTHER PUBLICATIONS

European International Search Report for PCT/US2014/0478211 dated Jan. 20, 2015.

*Primary Examiner* — Brian Glessner
*Assistant Examiner* — Paola Agudelo
(74) *Attorney, Agent, or Firm* — Shumaker, Loop & Kendrick, LLP

(57) ABSTRACT

The invention is a seal assembly, including a polyvinyl fluoride (PVF) film bonded to a polyvinylidene fluoride (PVDF) substrate and attached to a plastic retainer element for being mounted to an aircraft passenger fixture by mounting holes formed in the retainer element through which fasteners extend into the seat. The seal is sufficiently flexible to bend into an inner sidewall of an aircraft cabin and to seal a space between the aircraft cabin fixture and the inner sidewall.

15 Claims, 4 Drawing Sheets

(56) References Cited

U.S. PATENT DOCUMENTS

| | | | | |
|---|---|---|---|---|
| 5,251,917 A | * | 10/1993 | Chee | B64D 27/00 244/129.1 |
| 5,551,706 A | * | 9/1996 | Barna et al. | 277/312 |
| 5,979,828 A | * | 11/1999 | Gruensfelder | B60J 10/0037 244/129.1 |
| 7,658,044 B2 | * | 2/2010 | Roth | B64C 1/066 244/119 |
| 8,091,831 B2 | * | 1/2012 | Roming | B64C 1/14 244/129.4 |
| 2002/0182957 A1 | | 12/2002 | Levenda | |
| 2006/0102786 A1 | | 5/2006 | Granzeier et al. | |
| 2006/0249917 A1 | * | 11/2006 | Kosty | 277/644 |
| 2008/0073465 A1 | | 3/2008 | Veihelmann et al. | |
| 2008/0252022 A1 | * | 10/2008 | McComb | 277/647 |
| 2010/0307065 A1 | * | 12/2010 | Eckartsberg | 49/475.1 |
| 2011/0156353 A1 | * | 6/2011 | Kabutoya et al. | 277/312 |

* cited by examiner

AIRCRAFT SEAL

CROSS REFERENCE TO RELATED APPLICATIONS

This patent application expressly incorporates by reference, traces priority to, and is a non-provisional patent application of the U.S. provisional patent application having Ser. No. 61/858,779 filed on Jul. 26, 2013.

TECHNICAL FIELD AND BACKGROUND OF THE INVENTION

The present invention relates to a seal assembly particularly suitable for use in aircraft, where weight, fire-resistance, and low smoke generation are advantageous product characteristics. In the particular disclosure in this application, for purposes of illustration, the seal assembly is shown and described in connection with a seal assembly configured for being positioned between an aircraft passenger seat and an aircraft sidewall. However, other uses are expressly contemplated by the invention including, for example, monument seals, partitions, lavatories, and storage components.

The space between aircraft passenger seats and the aircraft sidewall is particularly likely to serve as a passageway for small objects such as service items dropped or deliberately placed in this space by passengers. When these objects fall to the deck of the aircraft in this confined space, retrieval by aircraft servicing personnel is difficult and time-consuming. In addition, in many seating arrangements electrical wiring, component boxes and other seating components underneath and to the side of the seats are accessible through this space. It is essential to prevent passengers from tampering with these components.

SUMMARY OF THE INVENTION

It is therefore an object of the present invention to provide a seal adapted to close off the space between aircraft fixtures and components.

It is a further object of the invention to provide a seal adapted to close off the space between aircraft passenger seats and other surfaces, such as the aircraft sidewall.

It is a further object of the invention to provide a seal adapted for use in aircraft and having low weight, fire-resistance, and low smoke generation characteristics.

These and other objects and advantages of the invention are achieved by providing an aircraft seal assembly having a plastic retainer including a plurality of mounting elements for being mounted to an aircraft cabin fixture. An elongate seal is bonded to the plastic retainer and includes a polyvinyl fluoride film bonded to a polyvinylidene fluoride substrate. The elongate seal is sufficiently flexible to bend into an inner sidewall of an aircraft cabin and to seal a space between the aircraft cabin fixture and the inner sidewall.

According to an embodiment of the invention, the polyvinylidene fluoride may be polyvinylidene difluoride (PVDF).

According to another embodiment of the invention, the polyvinyl fluoride film may be bonded to the polyvinylidene fluoride with a contact adhesive.

According to another embodiment of the invention, the elongate seal may be bonded to the plastic retainer with an epoxy bonding material.

According to another embodiment of the invention, the elongate seal may include a generally planar shape when not in contact with the inner sidewall.

According to another embodiment of the invention, the mounting elements may include holes through which fasteners extend into the aircraft cabin fixture.

According to another embodiment of the invention, the aircraft cabin fixture may include aircraft passenger shells, aircraft passenger seats, aircraft cabin monuments, aircraft cabin partitions, aircraft cabin lavatories, aircraft cabin storage components, and other aircraft cabin components which may be mounted to or located adjacent an aircraft cabin inner wall.

According to another embodiment of the invention, the plastic retainer may be made of a pair of overlapping reciprocal retainer elements. In such an embodiment, the elongate seal may form a rounded V shape. The edges of the V shape may be bonded to the retainer elements and the rounded portion of the rounded V shape may contact the aircraft cabin inner wall.

According to another embodiment of the invention, the pair of overlapping reciprocal retainer elements may be bonded to each other with an epoxy bonding material. Further, according to such an embodiment, the elongate seal may be bonded to the plastic retainer with an epoxy bonding material.

BRIEF DESCRIPTION OF THE DRAWING FIGURES

The present invention is best understood when the following detailed description of the invention is read with reference to the accompanying drawings, in which.

DETAILED DESCRIPTION OF THE PREFERRED EMBODIMENT

Figure 1:
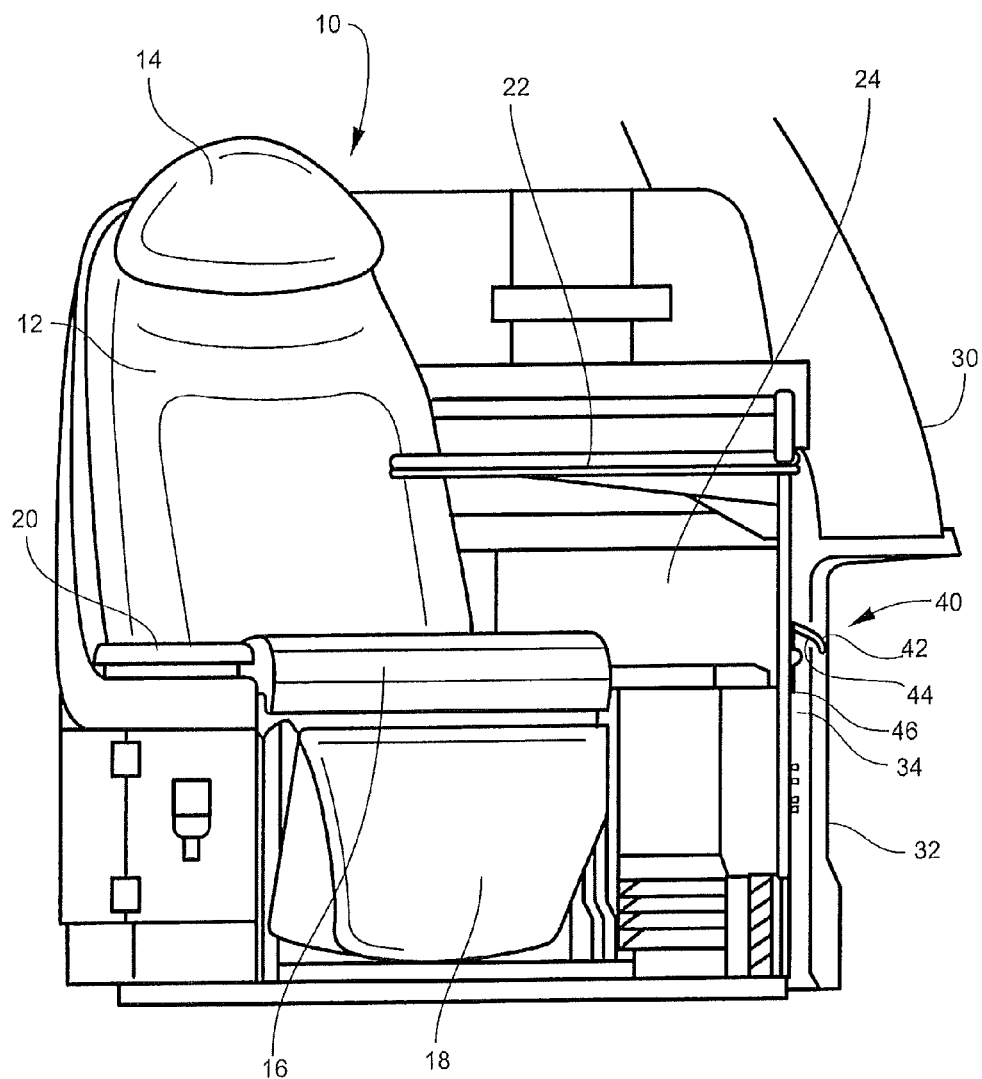
FIG. 1 is a front elevation view of an aircraft passenger seat positioned in proximity to an aircraft sidewall.
Figure 2:
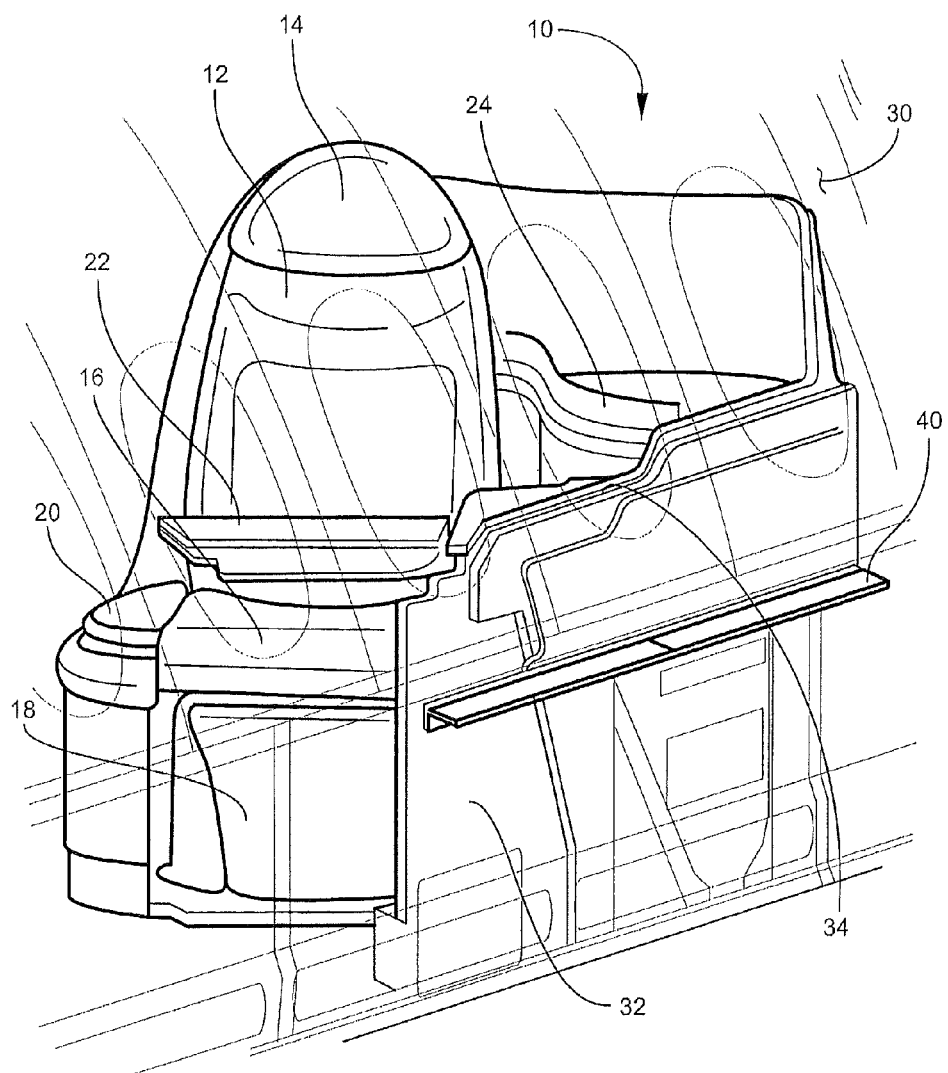
FIG. 2 is a front perspective view of the aircraft passenger seat shown in FIG. 1.
Figure 3:
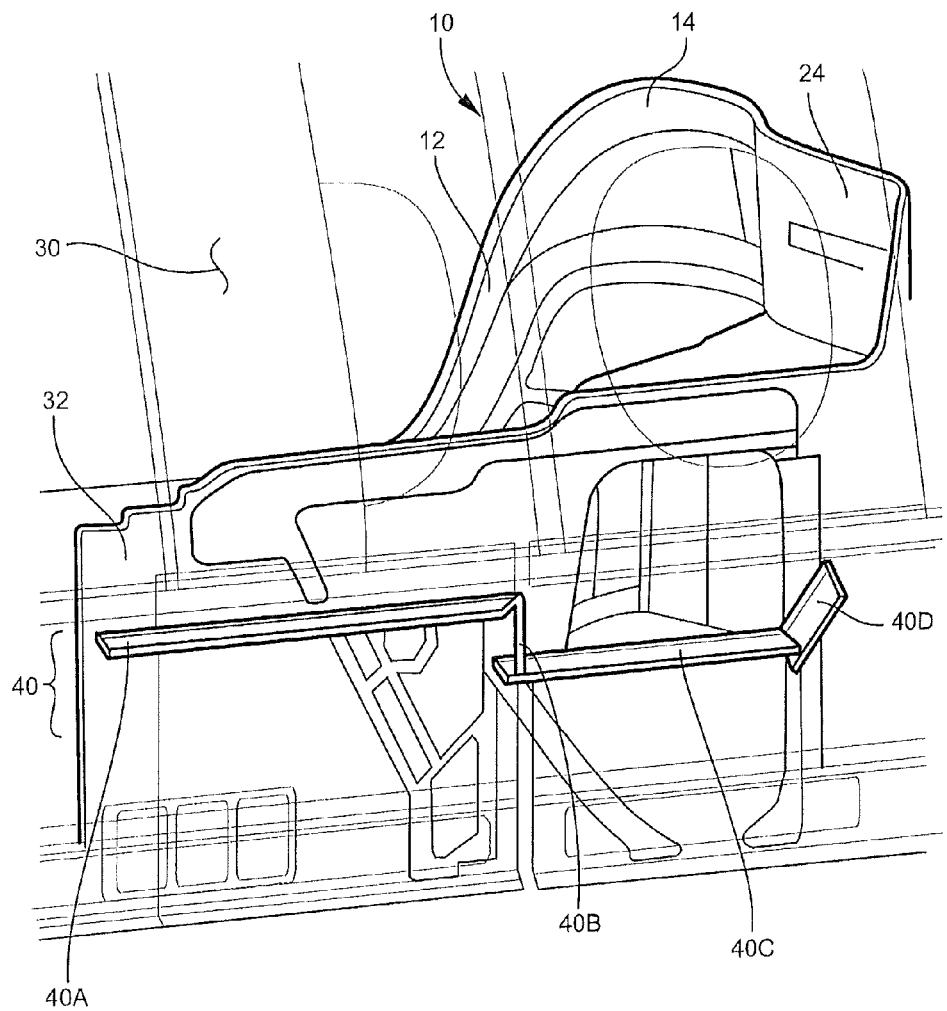
FIG. 3 is a side perspective view of the aircraft passenger seat shown in FIG. 1.

Referring now specifically to FIGS. 1, 2, and 3 of the drawings, a passenger seat 10 is shown of a type typically found in business class passenger cabins of commercial aircraft, and includes a seat back 12, headrest 14, seat bottom 16, leg rest 18, armrest 20 and meal tray 22. Other elements, such as video monitors, storage areas and the like are typically present depending on the level of service for which the seat is made available. In FIGS. 1, 2, and 3, the seat 10 includes a seat shell 24. In virtually all aircraft cabins, some seats are positioned closely proximate to the aircraft sidewall 32. As shown in FIGS. 1, 2, and 3, the aircraft includes an outer fuselage 30 that, together with ribs, stringers and other structural components, provide structural integrity to the aircraft. The aircraft inner sidewall 32 is spaced inwardly from the fuselage 30. The space between the fuselage 30 and inner sidewall 32 contains large numbers of system and control wiring harnesses and other components that travel along the length of the aircraft. These components are not accessible to passengers due to the imperforate structure of the inner sidewall 32. However, as shown in FIGS. 1, 2, and 3, a space 34 separates the seat 10 from the inner sidewall 32. Unless sealed, debris can accumulate in this area. Additionally, passengers may inadvertently damage seat components residing in this area when trying to retrieve dropped objects, or may deliberately tamper with the components in this area unless the area is sealed off from access by the passengers.

For this reason, an elongate seal assembly, such as seal assembly 40 in FIGS. 1, 2, and 3, is positioned along the side of the seat 10. The seal 40 extends along the side of the seat 10 adjacent to the inner sidewall 32, as best shown in FIG. 2, and around the back of the seat where it engages with the privacy shell 24, as is best shown in FIG. 3. As also shown in FIG. 3, the seal 40 includes several segments 40A, 40B, 40C, and 40D that are collectively oriented to seal against adjacent surfaces.

The seal 40 of FIGS. 1-3 is fabricated of polyvinyl fluoride (PVF), such as DuPont™ Tedlar® film 42, bonded to a polyvinylidene fluoride (PVDF) substrate 44 using a contact adhesive which is bonded to a plastic retainer element 46 with an epoxy bonding material. The seal 40 is attached to the seat 10 by forming mounting elements such as holes in the retainer element 46 through which fasteners extend into the seat 10. As best shown in FIG. 3, the seals 40A, 40B, 40C and 40D are formed in the same fashion and are positioned as required to seal off the spaces between the seat 10, the inner sidewall 32 and the seat shell 24.

Figure 4:
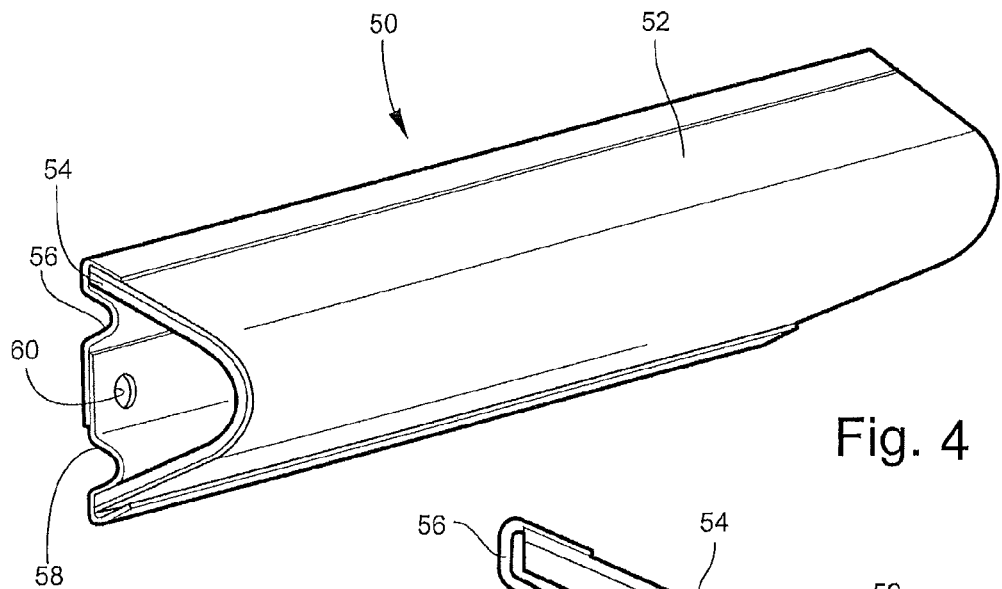
FIGS. 4, 5, and 6 are perspective and vertical cross-sections and a side view, respectively, of an alternative seal assembly configuration.
Figure 5:
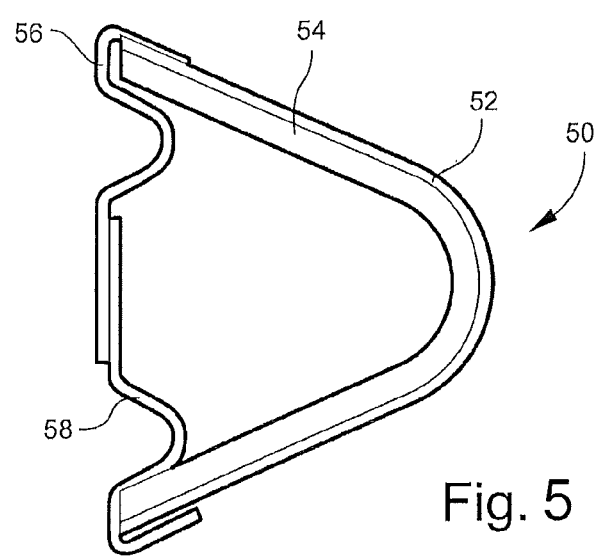
Figure 6:
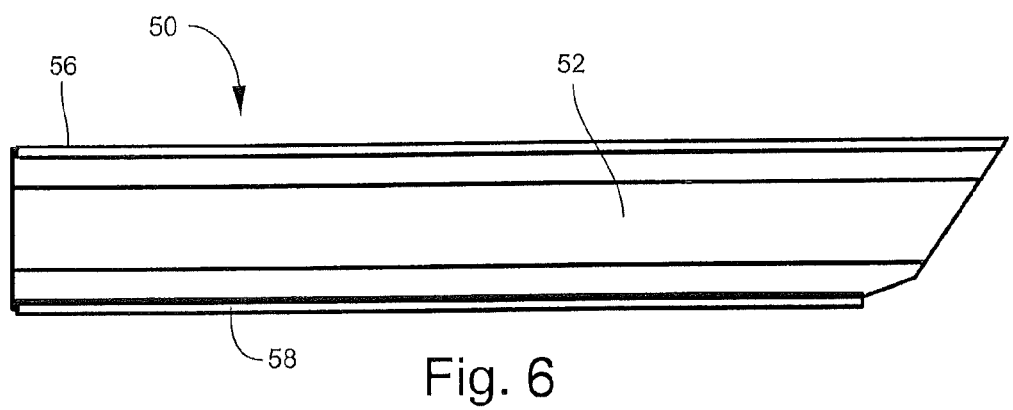

Referring now to FIGS. 4, 5 and 6, an alternative embodiment seal 50 is fabricated of polyvinyl fluoride (PVF), such as DuPont™ Tedlar® film 52, bonded to a polyvinylidene fluoride (PVDF) substrate 54 using a contact adhesive which is bonded to a pair of plastic retainer elements 56, 58 with an epoxy bonding material. As shown in FIG. 4, the retainer elements 56, 58 are overlapped and likewise bonded together with an epoxy bonding material.

The seal 50 is attached to the seat 10 by forming mounting holes 60 in the retainer elements 56, 58 through which fasteners extend into the seat 10. In a similar manner to FIGS. 1-3, the seals 50 are formed and are positioned as required to seal off the spaces between the seat 10, the inner sidewall 32 and the seat shell 24. The seal 50 has a rounded V shape where the rounded portion of the V contacts the sidewall 32. By comparing FIGS. 1-3 with FIGS. 4-6 it will be seen that the seal 40 is essentially the top half of the seal shown in FIGS. 4-6 when in contact with a sidewall 32.

Seals 40 and 50 are sufficiently flexible to bend into and seal against the inner sidewalls and privacy shell. Tedlar® polyvinyl fluoride (PVF)® provides a premium, durable finish to protect surfaces exposed to wear and contamination. Polyvinylidene fluoride, or polyvinylidene difluoride (PVDF) is a highly non-reactive and pure thermoplastic fluoropolymer produced by the polymerization of vinylidene difluoride. PVDF is a specialty plastic material in the fluoropolymer family. PVDF is used generally in applications requiring the highest purity, strength, and resistance to solvents, acids, bases and heat, and low smoke generation during a fire event. Compared to other fluoropolymers, it has an easier melt process because of its relatively low melting point of around 177° C., making it a suitable substrate on which to apply the PVF film.

The seals disclosed in this application are superior to prior art seals because of the ability to pass flammability requirements needed to meet FAA standards. In addition, the seal configuration can change on an as-needed basis between two variations such as seals 40 and 50, and the angle of the seals can be adjusted.

A seal assembly according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

We claim:
1. An aircraft seal assembly comprising:
   a. a retainer, made of a plastic, having a plurality of mounting elements for being mounted to an aircraft cabin fixture;
   b. an elongate seal bonded to the retainer and comprising a flexible film bonded to a flexible substrate; and
   c. wherein the elongate seal is flexible and is positioned in a space between the aircraft cabin fixture and an inner sidewall of an aircraft cabin to seal the space between the aircraft cabin fixture and the inner sidewall; and
   d. wherein the retainer further comprises a pair of overlapping reciprocal retainer elements.

2. The aircraft seal assembly of claim 1 wherein the flexible film is made from a polyvinyl fluoride (VDF), and the flexible substrate is made from a polyvinylidene difluoride (PVDF).

3. The aircraft seal assembly of claim 1 wherein the flexible film is bonded to the flexible substrate with a contact adhesive.

4. The aircraft seal assembly of claim 1 wherein the elongate seal is bonded to the retainer with an epoxy bonding material.

5. The aircraft seal assembly of claim 1 wherein the elongate seal comprises a generally planar shape when not in contact with the inner sidewall.

6. The aircraft seal assembly of claim 1 wherein the plurality of mounting elements comprises holes through which a plurality of fasteners extend into the aircraft cabin fixture.

7. The aircraft seal assembly of claim 1 wherein the aircraft cabin fixture is selected from the group consisting of: aircraft passenger shells, aircraft passenger seats, aircraft cabin monuments, aircraft cabin partitions, aircraft cabin lavatories, and aircraft cabin storage components.

8. The aircraft seal assembly of claim 1 wherein the elongate seal forms a rounded V shape.

9. The aircraft seal assembly of claim 1 wherein the pair of overlapping reciprocal retainer elements are bonded to each other with an epoxy bonding material and wherein the elongate seal is bonded to the plastic retainer with an epoxy bonding material.

10. An aircraft seal assembly comprising:
   a. a plastic retainer having a plurality of holes through which a plurality of fasteners pass for being mounted to an aircraft cabin fixture;
   b. an elongate seal bonded with an epoxy bonding material to the plastic retainer and comprising a polyvinyl fluoride (PVD) film bonded with a contact adhesive to a polyvinylidene fluoride substrate; and
   c. wherein the elongate seal comprises a generally planar shape when not in contact with an inner sidewall of an aircraft cabin, is flexible, and is positioned in a space between the aircraft cabin fixture and an inner sidewall of an aircraft cabin to seal the space between the aircraft cabin fixture and the inner sidewall.

11. The aircraft seal assembly of claim 10 wherein the polyvinylidene fluoride substrate is polyvinylidene difluoride (PVDF).

12. The aircraft seal assembly of claim 11 wherein the aircraft cabin fixture is selected from the group consisting of: aircraft passenger shells, aircraft passenger seats, aircraft cabin monuments, aircraft cabin partitions, aircraft cabin lavatories, and aircraft cabin storage components.

13. An aircraft seal assembly comprising;
a. a plastic retainer having a pair of overlapping reciprocal retainer elements, bonded to each other with an epoxy bonding material, and a plurality of holes through which a plurality of fasteners pass for being mounted to an aircraft cabin fixture;
b. an elongate seal having a rounded V shaped bonded with an epoxy bonding material at each terminus of the rounded V shape to the plastic retainer and comprising a polyvinyl fluoride film (PVF) bonded with a contact adhesive to a polyvinylidene fluoride substrate;
c. wherein the elongate seal is flexible and is positioned in a space between the aircraft fixture and an inner sidewall of an aircraft cabin to seal a space between the aircraft cabin fixture and the inner sidewall.

14. The aircraft seal assembly of claim 13 wherein the polyvinylidene fluoride substrate is polyvinylidene difluoride (PVDF).

15. The aircraft seal assembly of claim 14 wherein the aircraft cabin fixture is selected from the group consisting of: aircraft passenger shells, aircraft passenger seats, aircraft cabin monuments, aircraft cabin partitions, aircraft cabin lavatories, and aircraft cabin storage components.

* * * * *